United States Patent
Pope et al.

(10) Patent No.: US 10,491,400 B2
(45) Date of Patent: Nov. 26, 2019

(54) SYSTEM AND APPARATUS FOR PROVIDING NETWORK SECURITY

(71) Applicant: SOLARFLARE COMMUNICATIONS, INC., Irvine, CA (US)

(72) Inventors: Steven L. Pope, Cambridge (GB); David J. Riddoch, Huntingdon (GB)

(73) Assignee: SOLARFLARE COMMUNICATIONS, INC., Irvine, CA (US)

(*) Notice: Subject to any disclaimer, the term of this patent is extended or adjusted under 35 U.S.C. 154(b) by 103 days.

(21) Appl. No.: 15/244,955

(22) Filed: Aug. 23, 2016

(65) Prior Publication Data
US 2018/0062849 A1    Mar. 1, 2018

(51) Int. Cl.
| | |
|---|---|
| H04L 9/00 | (2006.01) |
| H04L 9/32 | (2006.01) |
| H04L 29/06 | (2006.01) |
| G06F 9/455 | (2018.01) |
| G06F 9/50 | (2006.01) |
| H04L 12/24 | (2006.01) |

(52) U.S. Cl.
CPC ........ H04L 9/3247 (2013.01); G06F 9/45558 (2013.01); G06F 9/5077 (2013.01); H04L 9/3297 (2013.01); H04L 41/5009 (2013.01); H04L 63/126 (2013.01); G06F 2009/4557 (2013.01)

(58) Field of Classification Search
CPC .................................................. H04L 9/3247
See application file for complete search history.

(56) References Cited

U.S. PATENT DOCUMENTS

| | | | |
|---|---|---|---|
| 8,473,316 B1 | 6/2013 | Panzitta et al. | |
| 2006/0174242 A1 | 8/2006 | Zhu et al. | |
| 2007/0005801 A1* | 1/2007 | Kumar | H04L 63/08 709/238 |
| 2012/0131341 A1 | 5/2012 | Mane et al. | |
| 2014/0317718 A1* | 10/2014 | Xue | H04L 63/1441 726/11 |
| 2015/0326542 A1 | 11/2015 | Serebrin | |
| 2016/0277447 A1* | 9/2016 | Pope | H04L 63/06 |
| 2016/0285864 A1* | 9/2016 | Canavor | H04L 63/0823 |
| 2016/0380896 A1* | 12/2016 | Caulfield | H04L 47/12 370/235 |
| 2017/0063975 A1* | 3/2017 | Prakash | H04L 67/1002 |

OTHER PUBLICATIONS

EP 17187578.4—Extended European Search Report dated Jan. 5, 2018, 11 pages.

(Continued)

*Primary Examiner* — Ashokkumar B Patel
*Assistant Examiner* — Syed M Ahsan
(74) *Attorney, Agent, or Firm* — Haynes, Beffel & Wolfeld LLP (57) ABSTRACT

A NIC is provided in a cloud infrastructure. The NIC has a first information which receives least one application message from an application supported by the infrastructure. The NIC digitally signs the application message and outputs the digitally signed message to a network.

21 Claims, 6 Drawing Sheets

(56) References Cited

OTHER PUBLICATIONS

Ruttgen, "nCipher Corporation Ltd." Jun. 9, 2006, pp. 1-27, URL:http://certum.eu/upload module/downloads/efpe/2006/prezentacje/3/01 R Ruetrgen nCipher.pdf (retrieved on Dec. 14, 2017).

Celesti, et al., "A Remote Attestation Approach for a Secure Virtual Machine Migration in Federated Cloud Environments," In Network Cloud Computing and Applications (NCCA), 2011 First International Symposium on, pp. 99-106. IEEE, 2011.

Adams, et al., "Internet X. 509 Public Key Infrastructure Time Stamp Protocol (TSP)," May 2001, 26 pages.

U.S. Appl. No. 16/121,366—Office Action dated Nov. 19, 2018, 14 pages.

* cited by examiner

SYSTEM AND APPARATUS FOR PROVIDING NETWORK SECURITY

BACKGROUND OF THE INVENTION

Field

Some embodiments relate to a system and apparatus for providing security within a network environment.

SUMMARY

According to an aspect, there is provided a hardware device for use in an infrastructure, comprising: a first interface configured to receive at least one application message from an application supported by the infrastructure; at least one processor configured to digitally sign said application message; and a second interface configured to output the digitally signed application message.

The at least one processor may be configured to digitally sign said application message by providing an authentication message.

The authentication message may comprise a time stamp,

The authentication message may comprise information identifying said hardware device.

The message may be at least partially encrypted.

The digitally signed application message may comprise an encapsulation part, and the application message, said application message comprising said authentication message The hardware device may be configured to bind with a controller to thereby bind said hardware device to a security domain associated with said controller.

The at least one processor may be configured to perform said binding prior to digitally signing.

The at least one processor may be configured to provide a binding ticket to said controller.

The binding ticket may comprise one or more of the following fields: a nonce, identify information associated with said hardware device, expiration time; identity information associated with the binding ticket; and a signature field which has a signature of at least one field.

The hardware device may be configured to receive from said controller configuration information, said hardware device being configured in accordance with said configuration information.

The hardware device may be configured to be bound to a plurality of different security domains.

The hardware device may be configured to receive for different security domains, different configuration information, said hardware device being configured in accordance with said configuration information.

The hardware device may be configured to receive said different configuration information from a respective controller associated with a respective security domain.

The configuration information associated with at least one security domain may be associated with a first level of privilege and configuration information associated with at least one other security domain is associated with a second, different level of privilege The hardware device may comprise a network interface device, a firewall; a switch or a load balancer.

According to another aspect, there may be provided an infrastructure comprising: a hardware device such as previously described.

The infrastructure may comprise a client component configured to provide said application message.

The infrastructure may comprise a virtualization layer configured to receive said application message from said client component, apply network encapsulation to said message and provide said application message to which said network encapsulation has been applied to said hardware device.

The infrastructure may comprise one or more of a: secure infrastructure; remote infrastructure; cloud infrastructure; data center infrastructure; a service provider infrastructure; and infrastructure provided as a service.

According to another aspect, there is provided a hardware device comprising: a first interface configured to receive at least one application message from an application; at least one processor configured to digitally sign said application message; and a second interface configured to output the digitally signed application message.

According to another aspect, there is provided a method comprising: receiving at a first interface of a hardware device at least one application message from an application supported by infrastructure comprising the hardware device; digitally signing said application message; and outputting the digitally signed application message.

The method may comprise digitally signing the application message by providing an authentication message.

The authentication message may comprise a time stamp.

The authentication message may comprise information identifying said hardware device.

The message may be at least partially encrypted.

The digitally signed application message may comprise an encapsulation part, and the application message, said application message comprising said authentication message.

The method may comprise binding the hardware device to a controller to thereby bind said hardware device to a security domain associated with said controller.

The method may comprise performing said binding prior to said digitally signing.

The method may comprise providing a binding ticket to said controller.

The binding ticket may comprise one or more of the following fields: a nonce, identify information associated with said hardware device, expiration time; identity information associated with the binding ticket; and a signature field which has a signature of at least one field.

The method may comprise receiving from said controller configuration information, said hardware device being configured in accordance with said configuration information.

The method may comprise binding the hardware to a plurality of different security domains.

The method may comprise receiving for different security domains, different configuration information, and configuring said hardware device in accordance with said different configuration information.

The method may comprise receiving said different configuration information from a respective controller associated with a respective security domain.

The configuration information associated with at least one security domain may be associated with a first level of privilege and configuration information associated with at least one other security domain is associated with a second, different level of privilege.

The hardware device may comprise a network interface device, a firewall; a switch or a load balancer.

The method may comprise receiving said application message from a client component, applying network encapsulation to said message and providing said application message to which said network encapsulation has been applied to said hardware device.

According to another aspect, there is provided a non-transitory computer readable storage device storing instructions that, when executed by at least one processor of a hardware device causes said at least one processor to perform the following steps: receive at an a first interface of the hardware device at least one application message from an application supported by infrastructure comprising the hardware device; digitally sign said application message; and output the digitally signed application message.

In some embodiments, a controller may be associated with a plurality of different security domains.

A controller has different privileges associated with different ones of said security domains.

According to an aspect there is provided a hardware device comprising: at least one processor configured to cause said hardware device to be bound to a plurality of different security domains, each security domain comprising a respective controller, said hardware device being separated from the or each controller by a network; and an interface configured to receive messages from said network and output messages onto said network.

The interface may be configured to receive from at least one controller, a respective binding token.

The at least one binding token is configured to expire if not used with a given time.

A respective controller associated with a first security domain may have a different privilege level to a respective controller associated with a second, different security domain.

The controller may configure the hardware device using a control channel there between in dependence on the respective privilege level associated with the security domain to which the hardware device and the controller belong.

The interface may be configured to receive from said respective controllers respective configuration information such that said hardware device is respectively configured for each of said different security domains.

In some embodiments, at least one controller may be associated with a plurality of different security domains.

In some embodiments, a plurality of controllers may be provided.

In some embodiments, a controller may be provided within a security domain of an infrastructure provider. Alternatively or additionally a controller may be provided in a security domain of a client.

In some embodiments, a plurality of controllers is configured to coordinate to ensure high availability, reliability, scalability of the functions of security domains.

According to an aspect there is provided a method comprising binding a hardware device to be bound to a plurality of different security domains, each security domain comprising a respective controller, said hardware device being separated from the or each controller by a network.

According to another aspect, there is provided a controller provided at a client device, said controller comprising at least one processor, said at least one processor being configured to: communicate with a plurality of different hardware devices, said hardware devices being provided in infrastructure, said controller being bound to a plurality of security domains, with different hardware devices being provided in different domains.

According to another aspect, there is provided a controller provided at a client device, said controller comprising at least one processor, said at least one processor being configured to: communicate with at least one hardware device, said hardware device being provided in an infrastructure, said communication being via a network between said controller and said hardware device, monitor a channel defined between said at least one hardware device and said controller; determine an alert condition; and in response said determining of an alert condition, generating an alert.

In some embodiments, alerts may be generated through communication between the hardware device and the controller.

In some embodiments, the controller monitors via a secure control channel. In other embodiments, the controller may monitor through application flows.

The channel may comprise a control plane channel.

The channel may comprise application level messages from said infrastructure.

The application level messages may be digitally signed by said hardware device.

The controller may be configured to control a secure domain, said alert condition occurring when said hardware device is not part of said secure domain.

The least one processor may be configured to: receive information from said hardware device and from said received information determine an alert condition.

The at least one processor may be configured to cause a request for said information to be sent to said hardware device.

In some embodiments, where application messages are signed by the hardware device, a checking function may be provided on a client side. The checking function may be provided by one or more of: a module, a software module, a software module in an operating system, a hypervisor, a network interface device, a hardware device and a library.

In some embodiments, the checking function may be configured to generate the alert. In other embodiments, the checking function may be configured to forward at least part of the message to another checking function. The checking function may forward the entire message or an authentication part of the message. The other checking function may be provided by the controller.

In some embodiment, a client application library may extract and monitor the information introduced by a rules engine into an application network flow.

According to another aspect, there is provided a method comprising: communicating with at least one hardware device, said hardware device being provided in an infrastructure, said communication being via a, monitoring a channel associated said at least one hardware device; determining an alert condition; and in response said determining of an alert condition, generating an alert.

According to an aspect there is provided a security domain comprising: a physical component associated with a first endpoint; a second endpoint, configured to communicate with said first endpoint, said first and second endpoints being separated by a network; and a controller associated with said second endpoint, said controller being bound to said physical component.

The physical component may comprise one or more of a network interface device, a firewall and a load balancer.

The physical component may be part of a secure infrastructure; remote infrastructure; cloud infrastructure; data center infrastructure; a service provider infrastructure; and infrastructure provided as a service.

According to another aspect there is provided a system comprising: a physical infrastructure providing virtualized infrastructure for a plurality of clients, said physical infrastructure having a subset of physical resources providing a virtualized infrastructure for a clients, said subset of physical resources comprising a physical component supporting an endpoint of a connection with a controller at a client, said physical component being bound to said controller.

The physical component may be a network interface device, a firewall; a switch or a load balancer.

The physical component may be bound to said controller using a cryptographic key exchange.

According to another aspect, there is provided a controller provided at a client device, said controller comprising at least one processor, said at least one processor being configured to: communicate with at least one hardware device, said hardware device being provided in an infrastructure, said communication being via a network between said controller and said hardware device, said controller being configured to provide a monitoring function with respect to the infrastructure.

According to another aspect, there is provided a method comprising: monitoring a infrastructure using a controller in a client device, said client device being separated from said infrastructure by a network, said infrastructure comprising a device secured to said controller.

A computer program comprising program code means adapted to perform the herein described methods may also be provided. In accordance with further embodiments apparatus and/or computer program product that can be embodied on a computer readable medium for providing at least one of the above methods is provided.

In the above, many different embodiments have been described. It should be appreciated that further embodiments may be provided by the combination of any two or more of the embodiments described above.

Various other aspects and further embodiments are also described in the following detailed description of examples embodying the invention and in the attached claims.

BRIEF DESCRIPTION OF DRAWINGS

Some embodiments will now be described by way of example only with reference to the accompanying Figures in which.

DETAILED DESCRIPTION OF EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
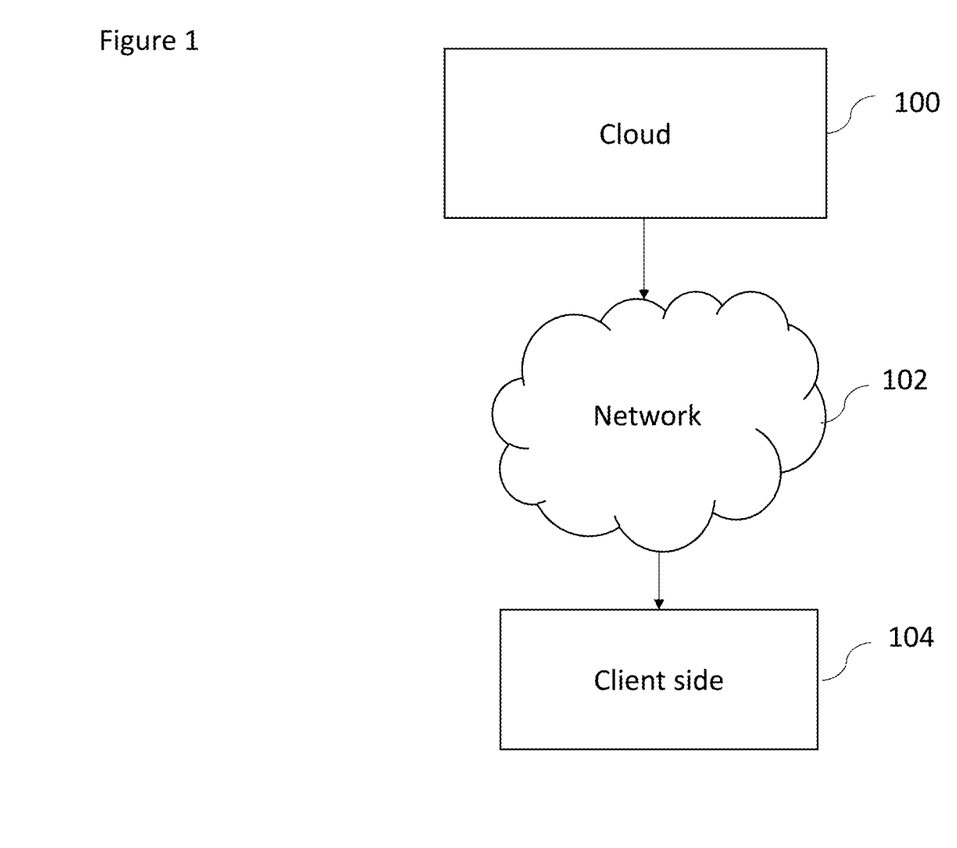
FIG. 1 shows a schematic view of a cloud based architecture.

Reference is made to FIG. 1 which schematically shows a cloud based architecture. The cloud based architecture comprises a client side 104. The client side may be provided by one or more computer devices. The computer devices may comprise one or more computers and/or one or more servers and/or any suitable one or more client devices. The client side may alternatively or additionally comprise a network. For example the client side may comprise an internal company network.

A cloud 100 of computing infrastructure is provided. Communication between the client side 104 and the cloud 100 is via a communications network. In some cases, the communications network may at least partially be considered to be provided by the cloud.

The cloud comprises a shared pool of computing resources. These computing resources may be any suitable resources. By way of example only, these pooled resources may comprise one or more of networks, servers and data storage.

Computing infrastructure is evolving to a model of service consumption whereby cloud providers of computation and/or storage act in a manner similar to the traditional utility providers. It is now common for a given consumer or client to deploy complex applications which themselves are implemented using multiple networked hosts to consume quantities of fully virtualized infrastructure.

The virtualization of CPU, memory and storage is a mature technology which has been a driver for companies providing service offerings such as Amazon's S3 and AWS (Amazon web services).

Networking protocols have evolved to support the provision of an entirely virtualized LAN (local area network). For example tunneling protocols such as VXLAN (virtual extensible LAN) and NVGRE (network virtualization using generic routing encapsulation) provide a consumer with an entirely virtualized network. The virtualized network may comprise one or more of virtual switches, hosts, network appliances and storage pools. For a service or cloud provider the cloud based platform can be provisioned and resource balanced over large pools of physical infra-structure. This can provide economies of scale and access to technologies which engender high efficiencies or access to cheap energy sources. Service (cloud) providers may automate the provision of the underlying cloud infrastructure. This may allow entire networks, applications and data to be instantiated, replicated and migrated seamlessly between different parts of the physical infrastructure. This may be done such that this is transparent to the consumer or client.

However in some situations, this flexibility to migrate between different parts of the physical infrastructure may be disadvantageous. For example an application whose components are supported by physically separated parts of the cloud infrastructure may suffer performance penalties. Another example is where data is required to reside within a geographic region for legal or security reasons and the cloud infrastructure is provided by resources in two or more geographic regions or countries. Whilst a cloud service provider may offer guarantees on physical locality on the particular infrastructure resources supporting a particular application, these guarantees may be inadvertently breached. Since the consumer or client is presented with an entirely virtualized infra-structure, currently the consumer is unable to verify or enforce these guarantees. Since the cloud service provider manages its service provision through mobility in order to achieve desired levels of operational efficiency there is always the possibility that an automation or human operator error could cause a compute container (or VM virtual machine) or a storage component to be migrated to a part of the infrastructure which does not satisfy the geographic location, for example.

It may be that a virtual network segment could inadvertently be carried over an inappropriate territory even if the final geographic location satisfies the location requirements.

Alternatively or additionally a virtual network segment may be carried over physical infrastructure which does not match for example a SLA (service level agreement). A SLA may specify a certain link speed and/or other criteria. A network link or virtual network lane which is supposed to be running at a certain link speed may in fact be misconfigured or faulty.

It is envisaged that operational efficiency demands in the future may mean that physical infrastructure workloads are required to be migrated over different geographic regions as a matter of course. For example renewable energy sources are not always dependable or fluctuate according to weather patterns or time.

Some embodiments may address one or more of previously discussed issues.

Some embodiment may allow the use of virtualized infrastructure whilst providing a more reliable guarantee to a customer/consumer as to the domain (for example geographical location) in which the virtualized infrastructure resides. This may be without revealing details of the underlying physical infrastructure.

Figure 2:
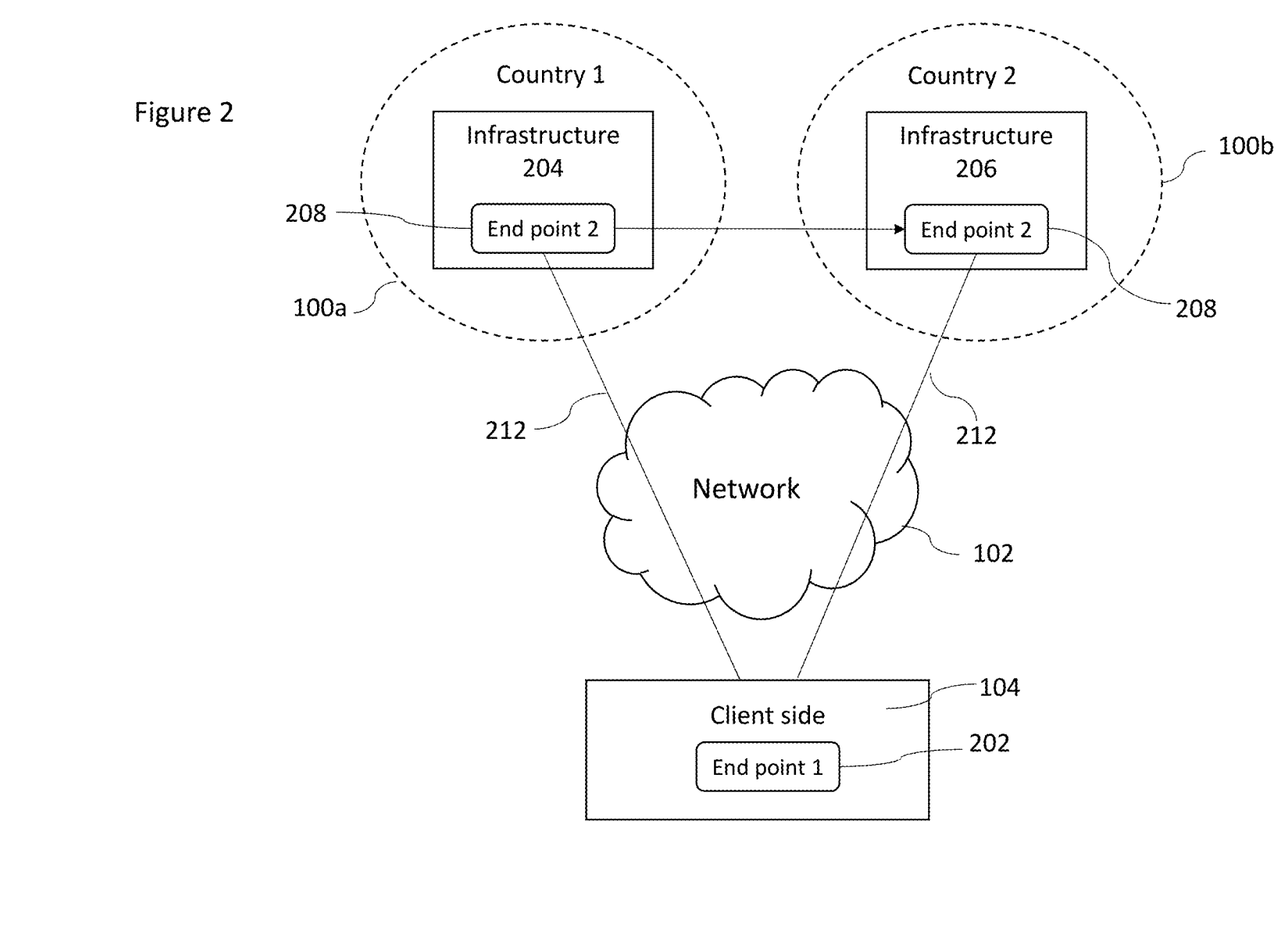
FIG. 2 shows endpoints of the cloud based architecture of FIG. 1.

Reference is made to FIG. 2 which shows in more detail communication between endpoints in a cloud or other virtualized environment. Communication or use of a virtualized infrastructure takes place over a network 102 and so any communication may be identified within a network as a label which identifies two communicating endpoints. In FIG. 2, the cloud is located in a first country 100a and a second country 100b. The cloud thus has physical infrastructure 204 in the first country and physical infrastructure 206 in the second country.

In this example, the infrastructure is in different countries. Alternatively or additionally, the different infrastructure may be in one or more of different data centers, domains and territory. Some embodiments may be used in any scenario where there is at least a first physical infrastructure and a second infrastructure and where one or more requirements of a user is not satisfied by one of the infrastructure and migration of virtual resources between the physical infrastructures is possible. The first and second infrastructure may be separately located or located in a common location. The first and second infrastructure may be part of a common infrastructure or physically different infrastructure, The communication may be represented as the common 5-Tuple. The 5-tuple is a set of five different values which comprise a TCP/IP (transmission control protocol/internet protocol). This set comprises a source IP address, source IP port number, a destination IP address, a destination IP port number and the protocol in use. It should be appreciated that other embodiments may use any other suitable flow labelling schemes such as MPLS (multiprotocol label switching).

When the network is virtualized, the communication flow is tunneled over an underlying physical network where the headers of the communicating flow are wrapped with an additional set of protocol headers which enable the flow to be delivered over the physical network. These headers are commonly called an overlay and depending on the deployment scenario may be stripped/inserted at the point where the service providing network is entered, or may be visible (although opaquely with no meaning) right through to the end hosts and operating systems of the consumer. In either case as far as the consumer is concerned, the inner protocol headers represent a 5-Tuple or flow label for a pair of communicating endpoints. The endpoints themselves would be communicating via a pair of network layer (e.g. IP) interfaces which are common for many flows.

In the example shown in FIG. 2, endpoint 1 (202) is provided at the client side 104 and the other endpoint 2 (208) is initially provided in the physical infrastructure 204 in the first country. The tunneled communication is referenced by reference number 212. The 5-Tuple will identify these two points. The overlay will allow the flow to be delivered to the endpoint 208 which is currently in the infrastructure 204 of the first country. Consider the scenario where the physical infrastructure which supports the second endpoint 208, is migrated such that the infrastructure 206 supporting the second endpoint 208 is in the second country. It should be appreciated that after migration the 5-Tuple is unchanged but the overlay will be changed to allow the flow to be delivered to the new physical location of the end point.

As far as the customer's application is concerned, the logical end to end flow is unchanged and may be invisible. For example, since the outer headers may be re-written at any router in the service provider's infrastructure, the outer headers may be rewritten at the point of ingress/egress to the service provider's infrastructure thereby leaving the outer headers unchanged from the client's perspective. Equally the entire overlay can be added/removed at this point of ingress/egress leaving the client's network to handle only the inner encapsulation and therefore the fact that tunneling at all has been employed within the service provider's network maybe entirely invisible.

Figure 3:
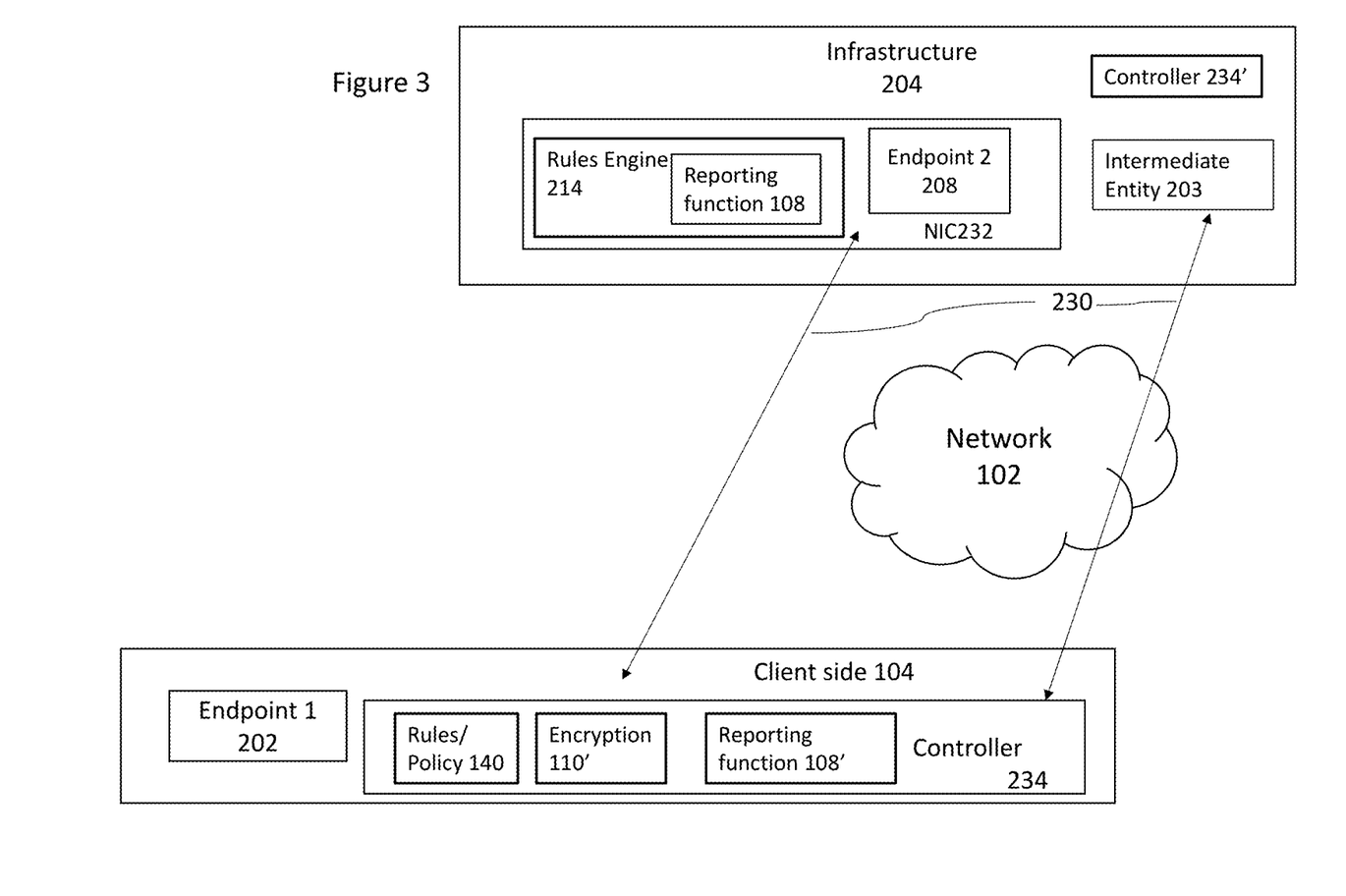
FIG. 3 shows a schematic view of a cloud based architecture of some embodiments.

Reference is made to FIG. 3 which shows an embodiment. Some embodiments provide for the definition of a logical set of network interfaces, termed a security domain. The membership of the security domain is secured by binding a physical component of a given endpoint in the cloud infrastructure such as a network interface device or card with a controller of the security domain. In the example shown in FIG. 3, the second endpoint is associated with a network interface device 232 of the physical infrastructure 204. The network interface device is part of the physical infrastructure. A controller 234 is provided at the client side. The network interface device is bound to the controller as referenced by reference number 230.

It should be appreciated that embodiments may be used to secure any part of a physical infrastructure. For example, in some embodiments, intermediate parts 203 of the physical infrastructure may alternatively or additionally be bound to the security domain. For example, the intermediate parts may comprise one or more of a firewall or load balancer. The binding is again referenced 230.

The following describe embodiments where the binding is to a network interface device which is referred to as a NIC. It should be appreciated that this is by way of example only and in other embodiments, the binding may be to any suitable device.

The binding may be achieved by a cryptographic key exchange between the network interface device and the controller. After the binding process has completed, encrypted and authenticated messages can be sent between the controller and the bound interface. These messages by virtue of being carried over a network flow enable a controller to assert that the network flow represents a communication to the bound interface. As such the remote interface is within the security domain and therefore that an application service which is communicating via the same network interface is also likely to be communicating to an endpoint which is within the security domain.

The controller/NIC control channel may not be the same network flow as the application/application. However it may differ only in the IP port number which the service provider may guarantee is not redirected. More generally given a flow label which has context (such as an IP subnet range or protocol port), this embodiment is useful where the service provider does not implement any virtualization within the agreed range.

A further embodiment using the addition of in-band messages will be described later. For example, the application messages may be signed, as will be described later. This latter embodiment may be useful, for example, in the context where the service provider also implements NAT (network address translation) on the inner headers. Here the client would see two flows which differ only in IP port numbers for example, but could be each routed to entirely different infra-structure. However the in band information in some embodiments would ensure that any such ambiguity is removed.

The controller 234 is logically also a member of the security domain, which runs on the client's/consumer's infrastructure, and is able to probe all network layer interfaces which are in use within the consumer's infrastructure. The controller is thus able to determine that the responding entity (that is endpoint 2) is bound to the security domain.

Some embodiments may provide one or more controllers of differing levels of privilege. One or more controllers may be outside of the service provider's infrastructure as shown in FIG. 3.

There may be different clients who are trusted differently or who have paid for a greater degree of control/instrumentation. The respective controllers of the different clients may therefore have different levels of privilege.

In some embodiments, there may be a plurality of controllers for any security domain. This may for example ensure scalability and/or high-availability. In some embodiments, the controllers may have the same or different levels of privilege.

Alternatively or additionally, one or more controllers may be in the service provider's infrastructure and owned by the service provider. For example the infrastructure may comprise one or more controllers 234'. The controller in the cloud infrastructure may have a different role to that at the client side. The controller in the cloud infrastructure may work independently of the client controllers and may be bound to a different security domain. In some cases, the controllers in the client and the cloud infrastructure may have different roles. For example, the service provider controller might perform firmware updates.

In some embodiments, higher privilege operations may only be issued by one or more controllers owned by the service provider. By way of example, such a higher privilege operation may be an upgrade of the physical device's firmware. Privilege is an attribute of the security domain. A number of controllers and NICs can be bound to a number of different security domains. The operations which any given controller and/or NIC can issue and/or perform depend on the privilege of the security domain to which they are both bound.

Privilege may be considered as the delegation of authority over a computer implemented system. Generally a higher the level of privilege means that more security sensitive operations can be performed as compared to a lower level of privilege. In some embodiments there may be two or more different levels of privilege. Each level of privilege may comprise a set of operations which the controller is permitted to perform.

In some embodiments, one controller may be associated with different security domains.

In some embodiments, a plurality of controllers may be provided.

In some embodiments, a controller may be provided within a security domain of an infrastructure provider. Alternatively or additionally a controller may be provided in a security domain of a client.

In some embodiments, there may be multiple controllers each implementing the functions of one or more security domains.

In some embodiments, multiple controllers may coordinate to ensure high availability, reliability, scalability of the functions of security domains.

In some embodiments, the one or more alerts may be generated through communication between the NIC and controller. When application messages are signed, the checking function may be provided on the client side infrastructure. This may be implemented in any suitable manner. For example this function may be provided by one or more of a: a software module within an operating system, a hypervisor, a network interface device on the client side; a library; and/or the like.

This function may directly generate alerts according to any suitable criteria, such as previously described or extract the authentication message and forwards the authentication message to another checking component or the entire message to the checking component. The checking component may be the controller of the relevant security domain.

In some embodiments, the service provider is free to migrate any service so long as it remains hosted by an endpoint (that is endpoint 2 in the example) which is bound to the same security domain. Failure to do so may not prevent connectivity or indeed likely prevent the application from running, but may be detected by the client's controller and therefore may be reported by the client's monitoring tools.

In a large data center it is required that there be many thousands of security domains. Equally any given client may require that different applications may themselves have differing requirements (or Service Level Agreements) and so require different security domains.

Therefore, in some embodiments a service provider's endpoint may be a member of more than one domain. In some embodiments, a service provider's endpoint may be provided in many different domains. By way of example only, the endpoint may be provided in 1000s of different domains. In some embodiments, a service provider's endpoint may be a member of only one domain.

For example, each endpoint may represent a server in a cloud. At any point in time, a cloud provider could legitimately schedule on any endpoint any one of the guest OS (operating system) instances from any of its clients. The cloud provider may also be entitled to migrate any guest from one machine to another so long as SLAs are preserved. Therefore each secured infrastructure needs to be a member of a security domain for each potential client.

In some embodiments the controller may control devices from a number of domains.

In some embodiments, a plurality of controllers may be provided, associated with a client.

At least one controller may be associated with at least one different domain to at least one other controller.

In some embodiments, a client may be provided with a plurality of controllers and each controller is associated with a subset of security domains. The subsets may not overlap or only partially overlap in some embodiments.

One or more client controllers may be associated with the same security domain.

In some embodiments, a client controller may be associated with a single security domain.

The service provider may retire or introduce new physical infrastructure. As long as that physical infrastructure is bound into one or more existing security domains, client controllers associated with the respective security domain will be able to confirm that SLAs and/or the respective one or more requirements are being met.

A provider may physically move bound infrastructure to a different physical location in breach of an SLA. However the prevention of such physical movement is relatively easy to enforce through existing process and physical controls. Physical movement of bound infrastructure is less likely to occur and much easier to control. This is contrast with difficulties addressed by some embodiments which may arise due load balancing or migrating workloads.

The binding may be part of a process which is made during either the establishment of an SLA or during physical infrastructure provisioning. The binding may not be for example part of the process of operationally balancing load or migrating workloads.

The binding protocol may use binding-tokens or tickets which are issued by the controller of the secure domain.

In some embodiments, the tokens or tickets will expire if not used within a certain time and are provided to the service provider. The tokens or tickets may be provided in any suitable way, for example using a layer of automation such as a RESTful API (application programming interface). REST is representational state transfer and is a software architectural style of the web. RESTful indicates conformance to the constraints of REST.

Once the service provider has applied the binding token to the physical infrastructure which is subject to a given agreement, then the client controller may securely communicate with that infrastructure over any network means. Application of the binding token means that the service provider and client controller have participated in the binding protocol described later which results in a key exchange such that a secure communication channel may be established between the controller and the infra-structure. In the example described later a binding token is generated by the controller and is passed to the service provider. This token is used to initiate the binding process which after completion leaves the controller in possession of a public key which has a private key counterpart stored in the NIC or the like. These keys can be later used to secure a communication channel by exchanging a symmetric cypher key used for a session.

The controller and infrastructure may communicate using any appropriate protocol such as TLS (transport layer security) which provides message authentication and/or encryption.

The controller may issue commands to which the infrastructure will respond depending on the level of privilege associated (by the service provider) with the given security domain.

For example, at a low level of privilege, the infrastructure will respond to a heart-beat request which is embedded within a network layer message, for example on a well-known port (or protocol). A positive response is used by the client controller to affirm that the network endpoint (IP for example) reached is a member of the given security domain.

At a higher level of privilege, the infrastructure may respond to a request-id request which returns a physical identifier of the infrastructure which has been reached. The physical identifier may be for example a unique manufacturing serial number. This identifier would change if for example the network service were migrated to other infrastructure within the security domain.

Tracking changes would enable a consumer to monitor performance levels as such resource balancing events which are occurring. This is even though the consumer or client has no control of such events or full visibility of such events.

At a higher level of privilege, the infrastructure may respond with more detailed statistics. This may comprise one or more of packet counts (for example in total for the infra-structure, and/or for the virtualized slice of the infrastructure associated with the security domain), physical link status, error counts, temperature, fan speeds, and physical firmware revision.

At a higher level of privilege, the infrastructure may enable commands to be sent directly via the control channel between the controller and the secured infrastructure to set hardware features directly. This may be used where these features are not exposed by the software APIs provided. These hardware features may apply to the entire infrastructure instance (a NIC for example) or if multi-tenant, to the virtualized slice relating to the security domain (a NIC PCIe [peripheral component interconnect express] Function for example).

These commands may be any suitable commands. For example the commands may allow for the setting of firewall rules which restrict the IP destinations to which the client applications running on the infrastructure may communicate, and/or block inbound traffic to the client infrastructure.

The communication protocol as discussed is between a client owned/managed controller and service provider infrastructure. There are also circumstances where the protocol may be used by the client applications themselves. For example the infrastructure (for example the NIC) can be instructed to generate and to insert or append an authentication message to every application message transmitted over the infrastructure. This may be termed a digital signing of each application message. The hardware may be the NIC or any other part of the secured physical infrastructure.

This authentication message (or digital signature) for example could allow every application message to contain a timestamp from the physical infrastructure as well as the identity of the physical infrastructure. The message may be encrypted by the keys bound within the infrastructure during the binding process. Since these keys are not known by the service provider they can be assumed to be of a high level of provenance and therefore if such signed messages were stored by the client, a client could expect reasonably to satisfy a future audit which required proof that a particular transaction occurred at a certain time or at a certain location.

Because these authentication messages are contained within the end to end application level flow, there is greater assurance to the client that the application flow is in fact secured by the described mechanism. This should be contrasted with the first embodiment which provides for a separate control channel which by virtue of securing a lower (OSI layer) interface provides an inference that flows to a higher (OSI layer) interface are also secured subject to the conditions mentioned previously.

Figure 4:
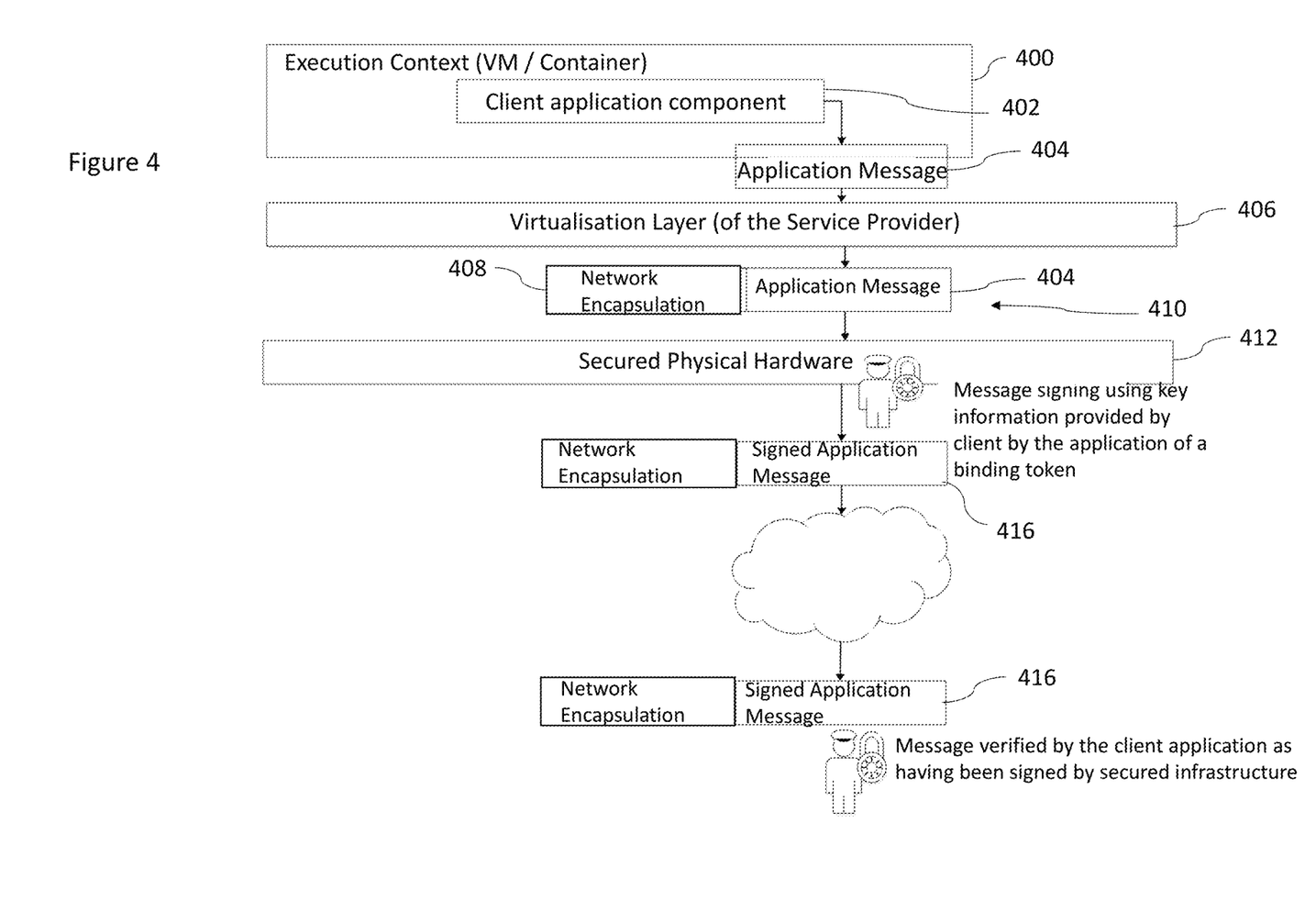
FIG. 4 shows messages used in some embodiments.

In this regard, reference is made to FIG. 4. In the physical infrastructure, there is a virtual machine 400. This supports a client application component 402 which generates an application message 404 which is provided to a virtualization layer 406 of the service provider. The virtualization layer applies the network encapsulation 408 to the application message 404 to provide an encapsulated message 410. The encapsulated message 410 is provided to the secured physical hardware 412, for example a NIC. This secured physical hardware will sign the application part 404 of the message using the key information provided by the client by application of a binding token. The resulting message 416 is transmitted to the client via the network. The message 416 will be verified by the client application as having been signed by the secured infrastructure.

If the message is not verified, this allows the client to know that the service provider may not be complying with for example the SLA.

The authentication messages are embedded within messages routed to a client application rather than a controller. Typically they are not processed by the client application itself which usually is required to be unaware of the feature. Instead the message is identified by some component of the client infrastructure which could be a router, middlebox, protocol stack, operating system, hypervisor or system library (or indeed the application itself). Typically this component would identify the authentication message and forward it along with metadata (such as the 5tuple flow identity) to the controller. The component would typically also remove the authentication message from the network frame before forwarding it onto the client application.

Figure 5:
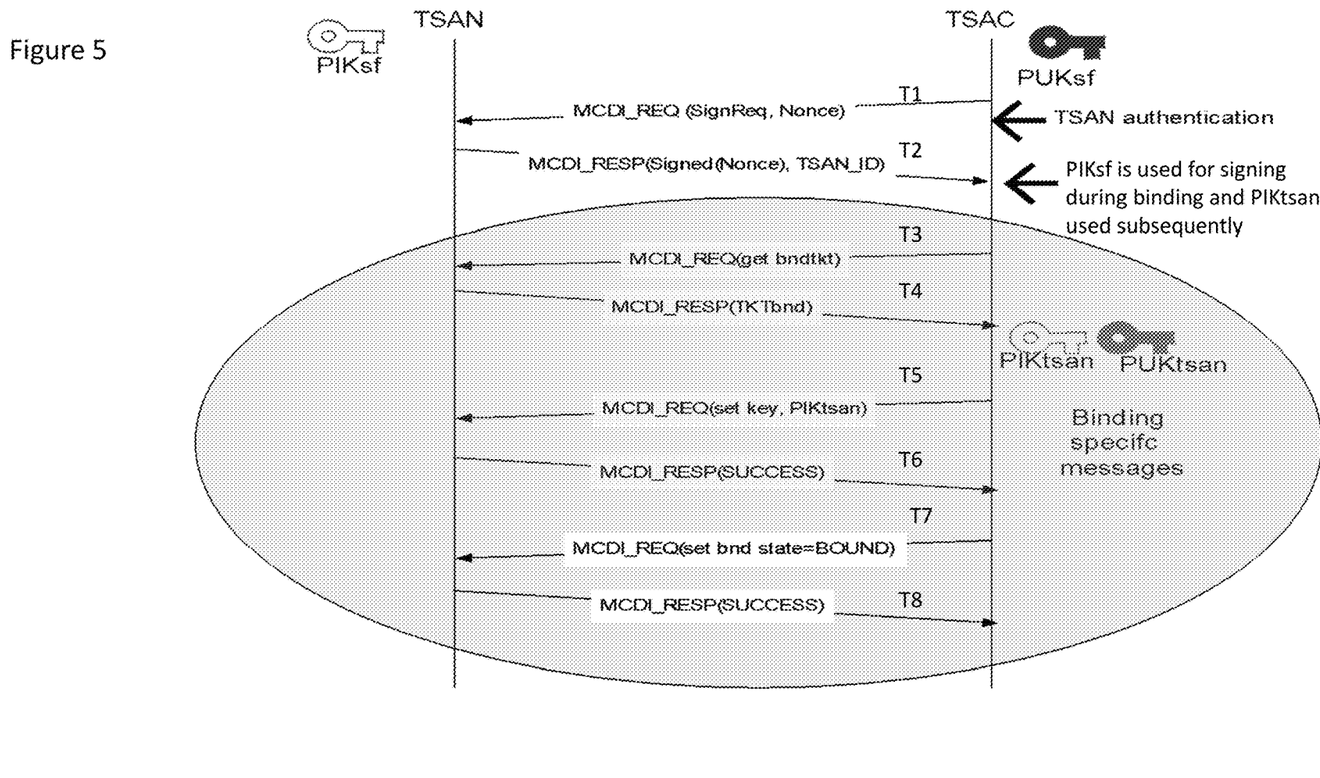
FIG. 5 shows a binding method used in some embodiments.

Reference will now be made to FIG. 5 which shows the binding process mentioned previously. In the following acronyms, definitions and abbreviations will be used.

Kfoo Symmetric key
PIKfoo Private part of public/private key pair
PUKfoo Public part of public/private key pair
TSA Trusted Server Adapter: Refers to the securely bound NIC and controller
TSAC TSA Controller
TSAID TSA Infrastructure Domain: A security domain encompassing a set of TSACs and TSANs
TSAN TSA NIC
TSAN-ID Unique identifier for the NIC—for example, the base MAC address
CERTfoo TLS certificate All connections to controller from other components, such as the NIC, are secure. That is, they may have the following properties:

Authentication: The component connecting to controller can be certain that it is talking to a valid controller.

Integrity: Messages passed over the connection cannot be manipulated by other parties.

Privacy: Messages passed over the connection cannot be read by other parties.

All connections may be made using SSH (secure shell), TLS, or the like.

The secure binding is the process of joining the NIC to a security domain. This is so as to cause the NIC to enforce the policies and configuration provided by the controller.

The binding process uses a binding ticket (TKTbind) to authorize the binding of the controller to the NIC, for example.

Binding preparation: An authorized user connects to a controller and authenticates. The user requests one or more binding tickets which the controller generates and returns.

Binding initiation: For each NIC to be bound a binding utility is invoked on a server containing the unbound NIC. Firmware is updated and a binding ticket is passed to the NIC and stored.

Binding completion: The NIC connects to the controller. Mutual authentication is performed and the binding ticket is passed to controller.

The structure of binding tickets may be known only to the controller. Other components may treat the binding tickets as opaque data.

TKTbind may comprise one or more of the following fields:
  A cryptographic nonce;
  NIC identity—ID;
  Expiry time EXPbind; and
  A signature of all the fields in binding ticket using PIKtsac (A private key of the controller).

A secure MAC (media access control) may use a key that is private to the secure domain. This key is generated by the controller and does not need to be exposed anywhere else.

The binding ticket may have the following structure:

```
/* binding ticket */
struct binding_ticket {
    uint8_t nonce[16]; /* Crypto nonce */
    uint8_t tsanid[6]; /* NIC MAC address—optional */
    uint32_t expire; /* Expiration time */
    uint8_t version_minor; /* Binding ticket major version
        number */
    uint8_t version_major; /* Binding ticket minor version
        number */
    uint8_t sig[128]; /* DER (distinguished encoding
        rules) encoded signature (ECC (elliptic curve cryp-
        tography)-384) of all of the above fields */
};
```

Before a NIC can bind to a controller, a security domain needs to be established/configured. This involves following steps. These steps are done either on a controller belonging to the domain or on a separate machine:

1. Configure the securing domain.
2. Create a private key for the Root certificate of the security domain—PIKroot.
3. Generate a self-signed CA (certificate authority) root certificate (CERTroot) using PIKroot.
4. Generate the Server certificate (CERTtsac) and server private key (PIKtsac) using the CA Root certificate. When generating the CERTtsac, the security domain identity is used (can be a number or string) as an input to the CN (Common name). The CERTtsac contains the PUKtsac (public key of the security domain). Note that each controller belonging to a security domain requires a separate server certificate but all CERTtasc's may be tied to the same CERTroot associated with the security domain. These unique server certificates are identified by CERTtsac(n) where n can be an integer representing the controller ID.
5. Install CERTroot, CERTtsac(n) and PIKtsac(n) on the controller(s) belonging to the security domain.

At this point the controller is ready to participate in the binding steps. Binding preparation involves generating TKTbind at the controller. One or more binding tickets are generated using one or more of the following parameters:

1. Security domain identity—same as the CN supplied during CERTtsac generation
2. Expiration time—EXPbind
3. PUKtsac Also generated is the cryptographic nonce.

The NIC may be configured with TKTbind, CERTroot and other binding configuration.

While in the ready-to-bind state the NIC periodically attempts to connect to controller. The NIC establishes a TLS or similar connection to a controller. TLS provides integrity, privacy and authentication of the controller to the NIC. During connection establishment, the NIC authenticates the controller by verifying the signature on CERTtsac using the public key from the root certificate (CERTroot).

Once the TLS connection is complete, the controller initiates the NIC authentication and binding sequence.

Authentication involves verifying that the NIC is a valid NIC. The NIC authenticates itself to the controller as shown in FIG. 5 and as will now be described.

In step T1, the controller sends a nonce via a MCDI command requesting the NIC to sign and send back the NIC ID and signed nonce N2. This step uses a NIC which is in the client's domain to sign the nonce using a private key PIK-sf which is not exposed outside of the NIC hardware. MCDI is the protocol used to talk locally from a host driver to the NIC firmware (Management Controller Driver Interface).

In step T2, the NIC sends a response to the controller by returning to the controller the signed nonce and the NIC identity—TSAN-ID, SIGN(PIKsf, {TSAN-ID, N2})}

In step T3, the controller validates the signature on N2 using the public key PUKsf. Based on the NIC identity, the controller identifies that this NIC has not completed binding and requests the binding ticket from the NIC by issuing a MCDI command.

In step T4, the NIC responds to the controller by sending the binding ticket TKTbind in MCDI response message.

In step T5, the controller validates the MAC in the binding ticket TKTbind. The binding ticket is signed by controller using PIKtsac when the ticket is generated. On receipt of the binding ticket, the controller verifies the signature using PUKtsac. The controller generates a new ECCRSA key pair PIKtsan/PUKtsan.

Optionally a client certificate containing PIKtsan and PUKtsan can be generated and used instead of individual keys. The controller stores a new entry for NIC in a database for the TSAID which includes {TSAN-ID, PUKtsan}. The controller does not store PIKtsan. The controller will send the new private key to the NIC by issuing MCDI command to install the new private key {PIKtsan, configuration}. PIKtsan is used to sign the nonce in subsequent connection attempts.

In step T6, the NIC provides a MCDI response indicating success.

In step T7, the controller provides an MCDI request to the NIC instructing the NIC to set the bind state to bound.

In step T8, the NIC acknowledges the message in a MCDI response.

The NIC is now bound to the secure domain.

It should be appreciated that the binding messages may be encrypted using the session key established during the TLS connection.

It should be appreciated that one or more of the described steps may be omitted. Two or more steps may be combined. In some embodiments, the order of one or more steps may be changed.

Once the NIC is bound to a controller, NIC configuration parameters and firmware be changed. In some embodiments, this and potentially other operations may be a function of privilege. Depending on the level of privilege, some controllers can change some but not all these parameters. Some controllers within the service provider's security domain may have the appropriate privilege to change more parameters. In some embodiments, some service providers may allow the local host to make some changes, depending on the privilege associated with the local host.

In some embodiments, the controller may handles public keys other than the private key (PIKtsac). PIKtsac may be stored in encrypted format on the controller.

In some embodiments, the controller may store one or more of the following data in a database. These may not need any encryption:

List of NIC IDs that completed binding
NIC to PUKtsan mapping
List of generated binding tickets and list of binding tickets that are unused and have not expired.

The NIC may store one or more the following:
CERTroot
PIKsf
PIKtsan

Some embodiments as described improve the visibility and security of communication between applications where the physical infrastructure is opaque.

The NIC is able to monitor which application is communicating and to where.

In one embodiment, the NIC may logically comprise a rule engine. However, it should be appreciated, that different embodiments may be implemented differently. Generally the NIC will have some processing capability provided by at least one processing device. The processing device may be any suitable processing device and may for example be an FPGA (Field Programmable Gate Array) or the like. The NIC may have some memory capability which may for example be provided in the FPGA or by any other suitable memory.

The communication between the rule engine and the controller is cryptographically or otherwise secure.

The communication between the NIC hardware and for example an application in the cloud may be controlled and/or monitored by a rules engine 214. In this embodiment, the rules engine is part of the NIC The function provided by the rules engine 214 is controlled by the controller. The connection provided between the controller and the rules engine 214 allows the controller to provide control information to the rules engine and/or for the rules engine to provide information to the controller. The rules engine may digitally sign application messages, in some embodiments.

In other embodiments, component to which the controller is bound may be one or more of a firewall, a switch, and a hypervisor. A rules engine such as described may be provided in any of these components.

The rules engine or any other suitable function may record all flow associated to and/or from the application. The rules engine may report to the controller via the control plane. The rules engine may have one or more rules which have an enforcement function.

The securing of the connection between the NIC and the controller may be as previously described. In some embodiments, state information associated with the data flows may be stored. This may comprise incrementing the flow counter.

The rules engine or other function of the component may have a function which is configured to encrypt messages sent to the controller and decrypt messages received from the controller.

The state may contain delivery information, for example to allow particular flows to be directed to different receive interfaces.

The rules engine or other suitable function may periodically provide its state relating to the data flows to its controller and/or the controller may request state from the rules engine or other suitable function. This provided by a reporting function 108 of the rules engine. This in turn allows reports to be provided by the reporting function 108' of the controller.

The rules engine may be implemented in FPGA, by an ASIC or any other suitable entity.

The controller may have a function 140 for configuring policy and rules.

The controller may have a function 110' which is configured to encrypt messages sent to the NIC and decrypt messages received from the NIC.

The controller may communicate with a plurality of NICs or rules engines 214. The rules engines and each of the NICs will have a secure connection with the controller.

In some embodiments, NIC or the like will use a different key to communicate with the same controller.

The controller may control a large number of components such as NICs or the like. By way of example only, some controllers may control the order of 1000 rules engines.

The controller may log and store operations for audit purposes. For example time, date, and identity may be stored. Identity may be a user identity, a flow identity and/or a functional block or entity identity.

The controller may be arranged to periodically query the NIC or the like for state updates.

The controller may be arranged to receive events, logging, statistics and flow table information from the NIC or the like and report this information to a management connection function.

In some embodiments, the controller may allow persistent NIC configuration settings to be set and reported. In some embodiments, the controller may allow NIC partitioning configuration to be set and reported.

The controller may support the gathering and remote monitoring of NIC operational statistics.

Figure 6:
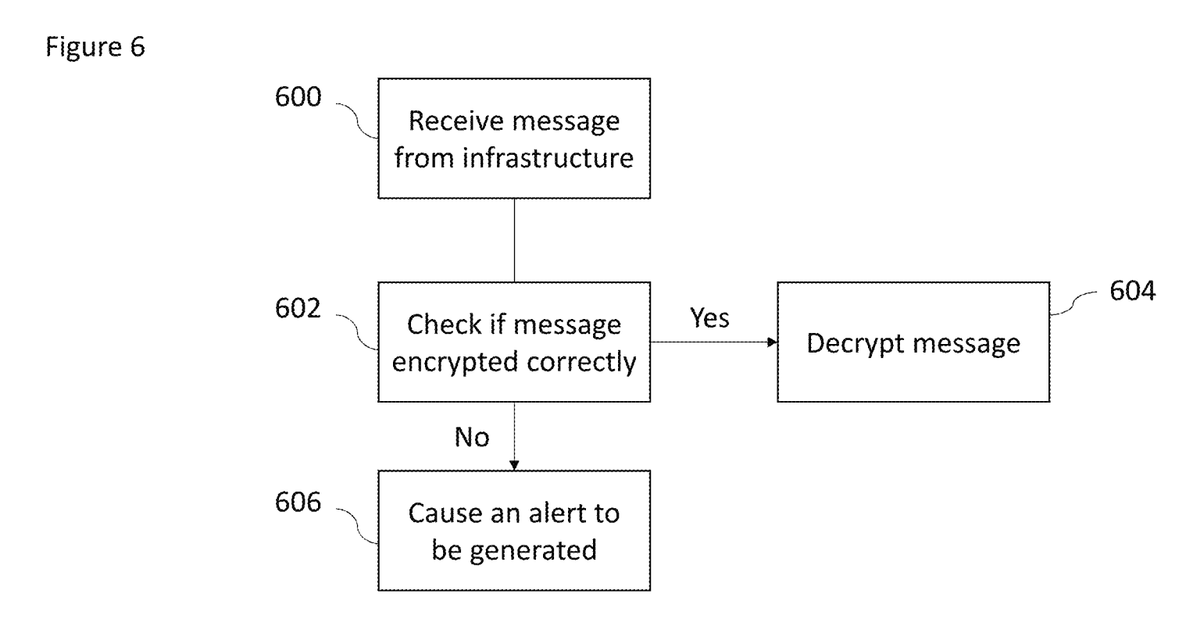
FIG. 6 shows a method carried out at a controller.

Reference will now be made to FIG. 6 which shows a method performed by a controller.

In step 600, the controller receives a message from the physical infrastructure. This may be a control plane message or may be an application message.

In step 602, the controller is configured to check if the message has been encrypted correctly or signed correctly. In other words, a NIC of the appropriate security domain has signed the application message or the message in the control plane between the NIC and the controller has the correct encryption.

In step 604, the controller will decrypt the message if the message has been encrypted correctly or signed correctly. In some embodiments, step 602 may comprise an attempt to decrypt the message using the appropriate key, in which case a separate step 604 may not be required.

In step 606, when it is determined that the message has not been encrypted correctly or signed correctly, an alert is generated which can be provided to a user at an appropriate time.

In some embodiments, an alert may be generated in response to one or more particular rule(s) being violated. There may be a plurality of different rules which have respective different conditions which cause an alert to be generated. An alert may provide information which indicates the reason for the generation of the alert.

An alert may be generated when a NIC is determined to be carrying network flows from outside the expected security domain.

An alert may be generated when an application message is determined to have been routed over a network which is outside the expected security domain.

An alert may be generated when a service level agreement has been determined to be violated.

Alternatively, the controller may be configured to send a request for data to the NIC or the like. Any suitable data collected by the NIC may be provided to the controller.

The control plane between the controller and the rule engine or other suitable function may be encrypted as previously described.

Some embodiments may use an asymmetric (or public-key) based exchange in order to establish the encrypted communication channel for the control plane.

The NICs and the controllers may be programmed securely with the asymmetric keys required to verify authenticity of exchanged messages.

In some embodiments, the NIC or other component may be programmed at manufacture or at a trusted customer location to securely store cryptographic key information. In some embodiments, at least some of the stored cryptographic key information may be unique to the particular component.

A hardware based rules engine may be designed to not release this information nor to allow it to be subsequently modified. A software based rules engine may use a HSM (Hardware Security Module) at the controller to store these keys in a secure manner.

In some embodiments, the NIC may be used as a secure place to store the keys and effectively act as an HSM.

In some embodiments, sensitive material may be stored in the ASIC for the benefit of applications. For example to allow server data to be stored only in an encrypted format and used decrypted by the NIC. This may provide an integration of HSM and NIC functionality.

Each controller may be programmed at manufacture or at a trusted location to securely store cryptographic key information. The device programming at manufacture may be implemented so as to not reveal the final key stored within the device, for example by the modification of a key provided to the device by the device itself using a source of random entropy. Techniques such as this would allow a device private key to be generated in a secure manner.

Once bound, either an asymmetric key pair is shared between the controller and the rules engine as described (typically the private key is known by the rules engine and the public key known by at least the controller), or alternatively each controller and rules engine pair know each other's public key and their own private key and can therefore communicate via standard asymmetric cryptography (e.g. RSA-2048) a new random shared key and establish a unique encrypted revocable communication channel (control plane). Communication over the control plane may use AES-256 (advanced encryption standard) or the like symmetric cypher. It may be that a given controller will need to use a set of cyphers to match that supported by the rules engine.

Alternatively, once bound, each controller-rules engine pair may communicate a shared key to establish a unique authenticated revocable communication channel using HMAC authentication.

The controller or NIC may periodically re-establish the secure connection with subsequent communication taking place using a new shared key This may take place relatively frequently in some embodiments.

The secure connections may be shared between sets of controllers which are bound to the same security domain. This allows provision of load balancing or allows scaling of the handling of NICs or allows provision of redundancy or other high availability features.

The connection messages may be carried using a network protocol appropriate for the hardware on which the rules engine or other function is implemented. For example the protocol may be UDP—user datagram protocol.

The relevant key should be stored securely as each NIC or the like allows. This may be by means of nonvolatile memory.

The controller may have received the IP address of each rules engine or NIC from a service provider or any suitable database. The rules engine or similar component may itself may discover the IP address of interfaces which are presented on the server in which it is installed alternatively by any suitable means, for example by snooping on traffic passing through its interfaces, or by other well-known discovery protocols such as DHCP (dynamic host configuration protocol) or through a management interface of the infrastructure service provider.

The rules engine authenticates the message (using the known controller public key) and decrypts using its own private key. The rules engine and Controller will use the resulting encryption key for subsequent communication.

The above steps can be repeated to change the public/private keys according to policy. For example policy could allow reprogramming of the keys where the update messages are signed by an authority, to allow devices to generate new keys (reporting only the public key), or to enforce one time only programming of keys into devices (requiring a device to be recycled if a key is revoked).

The controller may be provided by software running on the server. The server will comprise at least one processor and at least one memory.

The component such as the NIC or the like may comprise at least one processor and at least one memory.

A computer program may be stored in at least one memory and when run on a processor may be configured to provide the rules engine or the appropriate function.

A computer program may be stored in at least one memory and when run on a processor may be configured to provide the controller.

In some embodiments, the data flows passing through the rules engine may be encrypted for example SSL. The rules engine may perform protocol (for example TCP-transmission control protocol) reassembly and decrypt the flows before applying rules. The rules here could be regular expressions over any of the data payload, and could result in all or some of the decrypted payload being reported over the control plane. Optionally the rules engine may re-encrypt the data before passing to the host so that the operation is entirely transparent (a man-in the middle SSL bridge).

This may for example be applied in a rules engine provided in a NIC or other suitable component.

In the previously described embodiments, reference has been made to network interface device, sometimes referred to a NIC. A network interface device could be provided in any suitable form, including as a peripheral device or integrated with hardware of a host data processing device. A network interface device provides an interface to the network for use by its associated data processing device or the like.

The NIC may logically be a component of a server.

The NIC may be considered to be a physically separate and distinct piece of hardware and logically distinct network entity.

In some embodiments, the NIC may be implemented by a hardware device. In other embodiments, the NIC may be implemented by a hardware device along with software in an operating system for example.

In the previously described embodiments, reference has been made to network interface device. However, embodiments may be used with any suitable physical component in the infrastructure. By way of example only, that physical component may alternatively or additionally comprise a hypervisor, a switch, a load balancer, a firewall and/or the like.

The above embodiment has been described in the context of the so-called cloud architecture. It should be appreciated that embodiments may be used with any other arrangement where the physical resources which are associated with a particular end point can be changed such that a requirement for the physical resources is lost when the new physical resources are used. This requirement may be one or more of geographical location or a property of the physical resource itself, e.g. processor speed, network link speed or traversal of a particular appliance (e.g. a firewall).

The physical infrastructure has been described as being a cloud architecture. It should be appreciated that the infrastructure may comprise any other suitable infrastructure. For example, the infrastructure may comprise one or more of a secure infrastructure, a remote infrastructure, data center infrastructure; infrastructure provided as a service or any other suitable infrastructure. The secure infrastructure may for example be a control network for an airport.

Some embodiments may be used where at least some virtualization is supported so that the physical components supporting a particular service, application, database and/or the like can change.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A hardware device for use in a cloud infrastructure, comprising:
    a first interface configured to receive at least one application message from an application supported by the cloud infrastructure;
    at least one processor configured to digitally sign said application message; and
    a second interface configured to output the digitally signed application message, wherein said hardware device is configured to bind with a controller of a client infrastructure using a cryptographic key exchange between the hardware device and the controller of the client infrastructure, to thereby bind said hardware device to a security domain associated with said controller of the client infrastructure.

2. The hardware device as claimed in claim 1, wherein said at least one processor is configured to digitally sign said application message by providing an authentication message.

3. The hardware device as claimed in claim 2, wherein said authentication message comprises a time stamp.

4. The hardware device as claimed in claim 2, wherein said authentication message comprises information identifying said hardware device.

5. The hardware device as claimed in claim 1, wherein said message is at least partially encrypted.

6. The hardware device as claimed in claim 2, where said digitally signed application message comprises an encapsulation part, and the application message, said application message comprising said authentication message.

7. The hardware device as claimed in claim 1, where said at least one processor is configured to perform said binding prior to digitally signing.

8. The hardware device as claimed in claim 1, wherein said at least one processor is configured to provide a binding ticket to said controller.

9. The hardware device as claimed in claim 8, wherein said binding ticket comprises one or more of the following fields: a nonce, identify information associated with said hardware device, expiration time; identity information associated with the binding ticket; and a signature field which has a signature of at least one field.

10. The hardware device as claimed in claim 1, wherein said hardware device is configured to receive, from said controller, configuration information, said hardware device being configured in accordance with said configuration information.

11. The hardware device as claimed in claim 1, wherein said hardware device is configured to be bound to a plurality of different security domains.

12. The hardware device as claimed in claim 11, wherein said hardware device is configured to receive for different security domains, different configuration information, said hardware device being configured in accordance with said configuration information.

13. The hardware device as claimed in claim 12, wherein said hardware device is configured to receive said different configuration information from a respective controller associated with a respective security domain.

14. The hardware device as claimed in claim 13, wherein configuration information associated with at least one security domain is associated with a first level of privilege and configuration information associated with at least one other security domain is associated with a second, different level of privilege.

15. The hardware device as claimed in claim 1, wherein said hardware device comprises a network interface device, a firewall; a switch or a load balancer.

16. A cloud infrastructure comprising:
a hardware device comprising:
   a first interface configured to receive at least one application message from an application supported by the cloud infrastructure;
   at least one processor configured to digitally sign said application message; and
   a second interface configured to output the digitally signed application message, wherein said hardware device is configured to bind with a controller of a client infrastructure using a cryptographic key exchange between the hardware device and the controller of the client infrastructure, to thereby bind said hardware device to a security domain associated with said controller of the client infrastructure.

17. The cloud infrastructure as claimed in claim 16, comprising a client component configured to provide said application message.

18. The cloud infrastructure as claimed in claim 17, comprising a virtual machine which provides a virtualization layer configured to:
receive said application message from said client component;
apply network encapsulation to said application message to provide an encapsulated message; and
provide said encapsulated message to said hardware device.

19. The cloud infrastructure as claimed in claim 16, where said cloud infrastructure comprises one or more of a:
secure infrastructure;
remote infrastructure;
data center infrastructure;
a service provider infrastructure; and
infrastructure provided as a service.

20. A method comprising:
binding a hardware device with a controller of a client infrastructure using a cryptographic key exchange between the hardware device and the controller of the client infrastructure, to thereby bind said hardware device to a security domain associated with said controller of the client infrastructure;
receiving at an a first interface of the hardware device at least one application message from an application supported by cloud infrastructure comprising the hardware device;
digitally signing said application message; and
outputting the digitally signed application message.

21. A non-transitory computer readable storage device storing instructions that, when executed by at least one processor of a hardware device causes said at least one processor to perform the following steps:
bind the hardware device with a controller of a client infrastructure using a cryptographic key exchange between the hardware device and the controller of the client infrastructure, to thereby bind said hardware device to a security domain associated with said controller of the client infrastructure;
receive at an a first interface of a hardware device at least one application message from an application supported by cloud infrastructure comprising the hardware device;
digitally sign said application message; and
output the digitally signed application message.

* * * * *